Aug. 6, 1929.  E. W. DAVIS  1,723,269
LUBRICANT COMPRESSOR
Filed Oct. 1, 1924
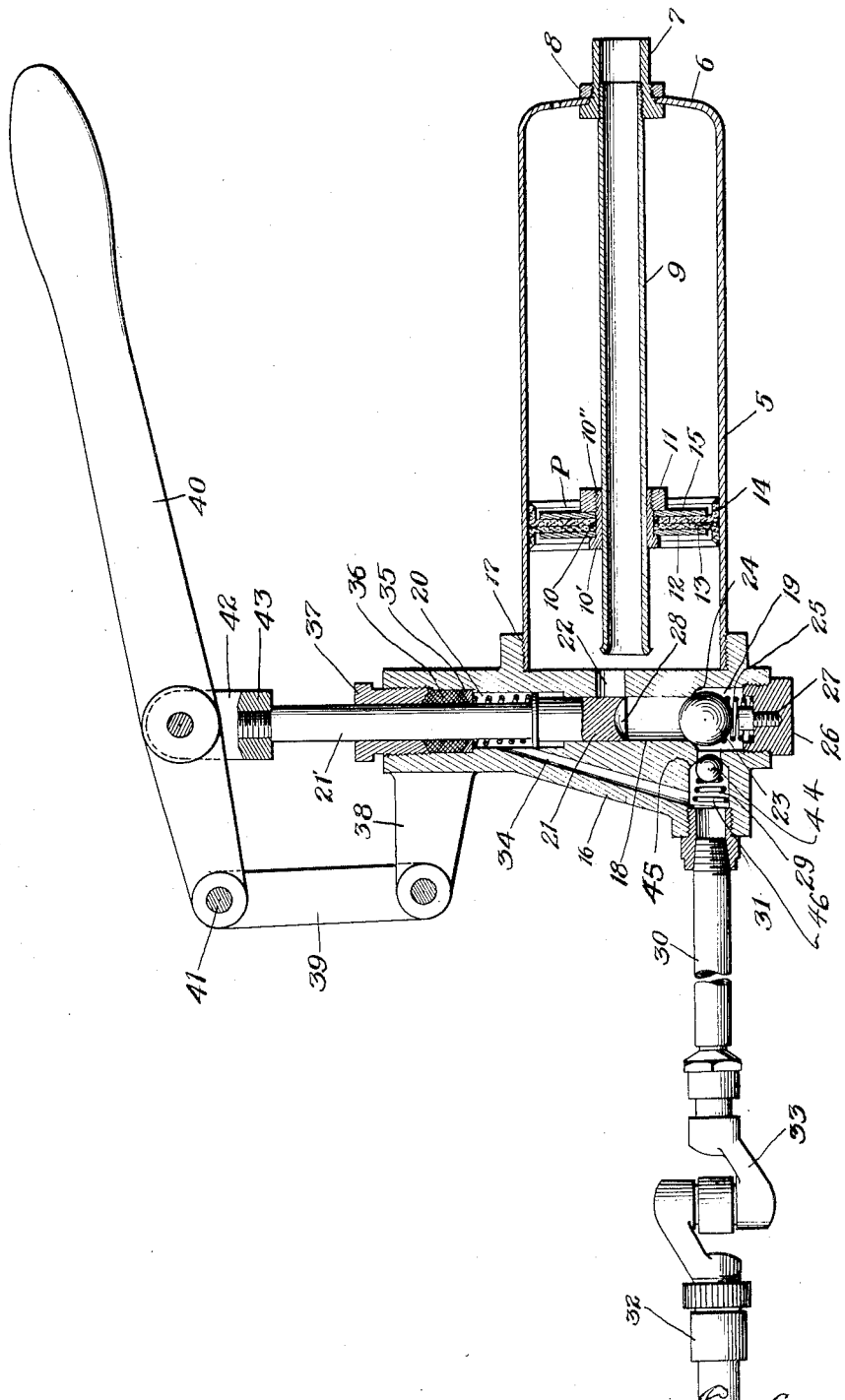
Inventor
Ernest W. Davis
By Earl F. Pierce
Atty.

Patented Aug. 6, 1929.

1,723,269

UNITED STATES PATENT OFFICE.

ERNEST W. DAVIS, OF OAK PARK, ILLINOIS, ASSIGNOR TO ALEMITE CORPORATION, OF CHICAGO, ILLINOIS, A CORPORATION OF DELAWARE.

LUBRICANT COMPRESSOR.

Application filed October 1, 1924. Serial No. 740,989.

My invention relates to improvements in lubricant compressors and is particularly concerned with the provision of a lubricant compressor suitable for use as a part of a high pressure lubricating system.

The lubricating system to which my invention relates comprises a plurality of fittings, adapted to be secured to the various bearings that are to receive lubricant, and a compressor for successively supplying lubricant to the several fittings, the compressor including a coupling for successively making sealed connections with the several fittings, so as to prevent the escape of lubricant. In such systems, pressures ranging from several hundred pounds to several thousand pounds are made use of and one of the objects of my present invention is to provide a compressor whereby the operator can easily produce, or even exceed, such pressures, as the occasion may require.

In some of the systems, such as described, the coupling member is locked to the fitting when the lubricant is under pressure and it is, therefore, necessary to relieve the pressure on the lubricant before the coupling can be detached from the fitting. Another object of my invention is, therefore, to provide a compressor embodying means whereby the pressure on the lubricant can be quickly and easily increased or relieved, so as to permit the coupling member to be removed from a fitting.

For ordinary purposes, pressures of from several hundred to a thousand pounds are sufficient, but in certain cases much higher pressures are required, and one of the novel features of my present invention is the provision of means for exerting ordinarily high pressures and other means for materially increasing these pressures, as occasion may demand.

A further object of my invention is the provision of a novel compressor embodying means whereby it can be easily and quickly refilled.

A still further object of my invention is to provide a compressor, such as described, that is simple in construction, economical to manufacture and easy to operate.

Other objects of my invention will appear as this description progresses, reference being had to the accompanying drawing in which one embodiment of my invention is shown in central, longitudinal section, the discharge conduit and coupling means being shown in elevation.

Referring to the drawing, my improved compressor comprises a barrel 5, one end of which is closed by the integral end wall 6. This end wall is provided with a central aperture for receiving the thimble 7 that extends therethrough and is clamped to the end wall by means of the nut 8 that threads onto the threaded portion of the thimble 7 and clamps it to the end wall. A filling tube 9 has its outer end threaded into the thimble 7, as shown in the drawing, and its inner end extends to a position adjacent the opposite end of the barrel.

A piston P is slidably mounted upon the tube 9. This piston comprises the sleeve 10, having the flange 10' at one end and the screw threads 10'' at the opposite end. A nut 11 is threaded onto the sleeve 10 and it clamps, between itself and the flange 10', the face plate 12, the cup leather 13, the rigidly positioned cup leather 14 and the follower plate 15, thereby forming a piston that tends to prevent leakage in either or both directions.

A cap 16 is detachably secured to the opposite end of the barrel 5, by means of a screwthreaded connection 17, or in any other suitable manner. This cap member is provided with a transverse bore 18, the end portions of which are enlarged in diameter to form the valve chamber 19 and the high pressure cylinder 20. The intermediate portion of the bore forms another cylinder in which the inner end of the plunger 21 reciprocates. This portion of the cylinder communicates with the barrel 5 through the port 22 that is closed by the plunger 21 when the latter is moved toward the valve chamber 19. A ball valve 23, of comparatively large diameter, is held against the seat 24, between the bore 18 and the valve chamber 19, by means of the compression spring 25, one end of which rests against the plug 26 that is threaded into the outer end of the valve chamber. A set screw 27, screwed into the inner end of the plug 26, limits the movement of the ball valve 23. The inner end of the plunger 21 is concave, as shown at 28, to receive a portion of the surface of the ball valve 23, thereby making it possible completely to discharge the contents of the cylinder formed by the intermediate portion of the bore 18.

The cap 16 has formed therein the discharge port 29 that communicates with the valve chamber 19 and also with the inner end of the flexible discharge conduit 30. This conduit is provided with a threaded nipple 31 that screws into the outer end of the discharge port 29. A coupling member 32, for making detachable connection with fittings secured to the bearings to be lubricated, is secured to and placed in communication with the discharge conduit 30, by means of the universal swivel 33, the details of construction of which are clearly shown in my application, Serial No. 666,722, filed October 5, 1923, now Patent No. 1,685,-351, dated Sept. 25, 1928.

A passageway 34, formed in the cap 16, establishes communication between the cylinder 20 and the discharge port 29 and in this manner brings the cylinder 20 into communication with the discharge conduit 30.

The outer end 21' of the plunger 21 is of smaller diameter than the inner end and thereby forms a differential piston, the function of which will later be referred to. A suitable gland 35, packing 36 and follower 37, secured in one end of the bore 18, prevent the escape of lubricant along the plunger.

For reciprocating the plunger I prefer to provide the cap 16 with a lug 38 to which a pair of links 39 (only one of which is shown) is pivotally connected. A lever 40 is pivotally connected with the links 39, as shown at 41, and intermediate its ends has a pivotal connection with the bifurcated end portion 42 of the member 43. This member is threaded upon the outer end of the plunger 21. By reciprocating or oscillating the handle 40, the plunger can be made to reciprocate in the two cylinders formed by the bore 18.

In the use of my improved compressor, lubricant is supplied thereto through the thimble 7 into the tube 9. This will cause the plunger P to move toward the end of the barrel opposite the cap 16. After the barrel 5 has been supplied with a quantity of lubricant, and the coupling member 32 attached to a fitting to receive lubricant, the operator grasps the barrel 5 in one hand and the lever 40 in the other hand and then, by moving these two elements away from each other, moves the plunger to its extreme outer position. In doing this, a vacuum is created in the intermediate portion of the bore 18 that communicates with the port 22 and the port 22 is uncovered. Atmospheric pressure, exerted upon the outer face of the piston P, causes the latter to move toward the cap 16, thereby forcing lubricant into the cylinder formed by the intermediate portion of the bore 18. The operator then moves the barrel 5 and the lever 40 toward each other, thus forcing the plunger 21 toward the valve chamber 19 and completely expelling the contents of the cylinder formed by the intermediate portion of the bore 18. This lubricant will be expelled past the valve 28 and the check valve 44, that is yieldingly held against the seat 45, by means of the spring 46, into the discharge port and from thence into the discharge conduit 30. A portion of the lubricant will be forced through the passageway 34 into the cylinder 20, but inasmuch as the clearance between the reduced portion 21' of the plunger and the walls of the cylinder 20 is comparatively small, these spaces will be quickly filled with lubricant and then all the lubricant expelled by the plunger 21 will be forced out through the discharge conduit 30, the swivel 33 and the coupling member 32.

By repeating the operations just described, the operator can force as much lubricant through the coupling member 32 and the fitting connected therewith as may be desired, providing the resistance to the passage of the lubricant is not too great.

If the bearing to which the lubricant is being supplied is of such nature that it offers very considerable resistance to the passage of the lubricant, the operator, after having filled the discharge conduit 30, swivel 33 and coupling 32 as described, can easily place a very much higher pressure upon the lubricant by moving the handle 40 away from the barrel 5, thereby bringing the larger portion 21 of the plunger into the cylinder 20. The amount of lubricant displaced in this manner will be comparatively small and the operator will, therefore, be able to place comparatively great pressure upon the lubricant in the cylinder 20, forcing it out through the passageway 34 and the discharge conduit 30. By alternately priming the cylinder 20 and then expelling the lubricant as just described, the operator can discharge as much lubricant from the cylinder 20 under high pressure as may be desired.

When sufficient lubricant has been supplied to a fitting, it is desirable to be able to relieve the pressure upon the lubricant in the discharge conduit before an attempt is made to uncouple the coupling member 32 from the fitting. This can be accomplished by first separating the barrel 5 and the lever 40 as far as possible and then bringing these two members to the positions shown in the drawing. In doing this the larger inner portion of the plunger 21 will move out of the cylinder 20 and be replaced by that portion of the plunger that is smaller in diameter. In this manner, the displacement, or capacity, of the cylinder 20 is increased sufficiently to permit any pressure that may exist on the lubricant in the discharge conduit to cause the lubricant to move backwardly through the passageway 34 and into the cylinder 20. In this manner, the pressure on the lubricant in the coupling member 32 can be reduced sufficiently to permit it easily to be detached from the fitting.

It will, of course, be understood that when my improved compressor is used for placing excessively high pressure upon the lubricant, the check valve 44 prevents the return of lubricant to the valve chamber 19.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A portable lubricant compressor comprising a barrel, a cylinder communicating therewith and having a discharge port, a second cylinder communicating with said discharge port, a non-return valve positioned between said cylinders, and a single plunger reciprocable in both of said cylinders and having an annular differential portion for effecting changes of pressure in said second cylinder.

2. A lubricant compressor comprising a barrel, a cylinder communicating therewith and having a discharge port, a second cylinder communicating with said discharge port, said second cylinder being an aligned continuation of said first cylinder, a non-return valve positioned between said cylinders, and a single plunger reciprocable in both of said cylinders.

3. A lubricant compressor comprising a barrel, a low pressure cylinder communicating with said barrel, a second high pressure cylinder communicating with said first named cylinder, and a single plunger extending through one and into the other of said cylinders for effecting changes of pressure of different degrees in both of said cylinders.

4. A lubricant compressor comprising a barrel, a cylinder communicating with said barrel, means for ejecting lubricant from said cylinder, including a plunger reciprocable in said cylinder, and other means, including said plunger, for releasing the pressure upon the lubricant discharged from said cylinder.

5. A lubricant compressor comprising a barrel, a discharge conduit communicating with said barrel, means located between said barrel and said discharge conduit for placing the lubricant under pressure, and other means for either increasing or decreasing the pressure upon the lubricant.

6. A lubricant compressor comprising a barrel, an open tube mounted in one end of said barrel, a piston slidable upon said tube and reciprocable in said barrel, and means connected with the opposite end of said barrel for receiving the lubricant from said barrel and ejecting it under pressure.

7. A lubricant compressor comprising a barrel adapted to act as a handle for manipulating the compressor, a tube secured in one end of said barrel and projecting to a point adjacent the opposite end of said barrel, an annular piston slidably mounted on said tube and reciprocable in said barrel, a cap detachably secured to the opposite end of said barrel, said cap having a transverse bore therein, both ends of said bore being larger in diameter than intermediate portions thereof, said cap having a port for establishing communication between the intermediate portion of said bore and said barrel, a plunger reciprocably mounted in the intermediate portion of said bore and having a portion of reduced diameter extending outwardly through one of the enlarged end portions of said transverse bore, a lever pivotally mounted upon said cap and pivotally connected with the outer end of said plunger, an outwardly opening check valve in the other enlarged end portion of said transverse bore, said cap having a discharge port communicating with said last named enlarged portion of said transverse bore, an outwardly opening check valve controlling the passage of lubricant through said discharge port, and a passageway for establishing communication between said discharge port and the enlarged portion of said bore through which said plunger extends.

8. A lubricant compressor comprising a barrel, a follower slidable in said barrel, means for ejecting lubricant from said barrel in front of said follower, said barrel having an air inlet behind said follower, and means forming a continuously open filling inlet passage communicating with said barrel in front of said follower.

9. A lubricant compressor comprising a barrel, a cap secured to one end of said barrel, said cap having a transverse bore therein, both ends of said bore being larger in diameter than intermediate portions thereof, said cap having a port for establishing communication between the intermediate portion of said bore and said barrel, a plunger reciprocably mounted in the intermediate portion of said bore and having a portion of reduced diameter extending outwardly through one of the enlarged end portions of said transverse bore, a lever for reciprocating said plunger, an outwardly opening check valve in the other enlarged end portion of said transverse bore, said cap having a discharge port communicating with said last named enlarged portion of said transverse bore, an outwardly opening check valve controlling the passage of lubricant through said discharge port, and a passageway for establishing communication between said discharge port and the enlarged portion of said bore through which said plunger extends.

10. A lubricant compressor comprising a barrel for holding a supply of lubricant, a cap for closing one end of said barrel, said cap having a transverse bore and provided with a port for establishing communication between said barrel and said bore, a plunger reciprocable in said bore and acting as a valve to close said port, said cap having a discharge port communicating with one end of said transverse bore, and a passageway between said discharge port and the other end of said transverse bore, said plunger having piston ends of different areas facing the opposite ends of said bore.

11. A lubricant compressor comprising a barrel, a cap for closing one end of said barrel, said cap having a bore communicating with said barrel, a plunger reciprocable in said bore, one part of said plunger being smaller in diameter than the other part so as to produce an annular space between the reduced portion of said plunger and the walls of said bore, said cap having a discharge port, and a passageway for establishing communication between said discharge port and said annular space.

12. A lubricant compressor comprising a barrel, a follower slidable freely in said barrel, means for ejecting lubricant from said barrel in front of said follower, said barrel having an air inlet behind said follower, said follower being movable by atmospheric pressure upon withdrawal of lubricant by said ejecting means to move the remaining lubricant toward said ejecting means, and means forming a continuously open filling inlet passage communicating with said barrel.

13. A lubricant compressor comprising a barrel, an open tube mounted in one end of said barrel, and extending to the remote end of the barrel for delivering lubricant thereto, a follower piston slidable on said tube, co-operating means on said piston and tube for limiting the extent of its movement, and means communicating with said barrel for receiving the lubricant therefrom and discharging it under pressure.

14. A lubricant compressor comprising a barrel, a discharge conduit adapted to receive lubricant from said barrel, means intermediate said discharge conduit and said barrel for varying the pressure upon the lubricant in said discharge conduit, said means including cylinders of different diameters and a plunger having portions complemental to said cylinders and movable to place the lubricant under high pressure, extremely high pressure, or to reduce the pressure upon the lubricant.

15. A lubricant compressor comprising a barrel, a cylinder communicating with said barrel, means for ejecting lubricant from said cylinder comprising a plunger reciprocable in said cylinder, means for operating said plunger, and other means optionally operable by said plunger operating means to increase or relieve the pressure upon the lubricant discharged from said cylinder.

In witness whereof, I hereunto subscribe my name this 27th day of September, 1924.

ERNEST W. DAVIS.